Nov. 4, 1958 D. L. TOBIAS ET AL 2,859,288

AMPLIFIER GAIN CONTROL CIRCUIT

Filed Dec. 7, 1955

United States Patent Office 2,859,288
Patented Nov. 4, 1958

2,859,288

AMPLIFIER GAIN CONTROL CIRCUIT

David L. Tobias, Fairport, and Arthur H. Zefting, Rochester, N. Y., assignors to General Dynamics Corporation, a corporation of Delaware Application December 7, 1955, Serial No. 551,497

5 Claims. (Cl. 179—171)

Our invention relates to control circuits and more particularly to gain control circuits.

It is frequently necessary to control the gain of an amplifier at a rate which falls within its passband. Thus, there may be a requirement for varying the gain of an audio amplifier at an audible rate. In gain control circuits known heretofore, such gain variation may appear in the output of the amplifier when no signal is present, or may form a distinguishable output component without modulating the input signals of the amplifier. In many instances, such a condition is entirely unacceptable.

It is accordingly an object of our invention to provide a new and improved gain control circuit.

It is a further object of our invention to provide a gain control circuit in which the gain may be varied at a rate falling within the passband of the amplifier without the gain control signal per se appearing in the output of the amplifier or without controlling the gain of the input signal.

Further objects and advantages of our invention will become apparent as the following description proceeds, and the features and novelty which characterize our invention will be pointed out with particularity in the claims annexed to and forming a part of this specification. For a better understanding of our invention, reference may be had to the accompanying drawings in which Fig. 1 is a circuit drawing of a preferred embodiment of our invention; and Fig. 2 is a circuit drawing of another embodiment of our invention.

In general, we accomplish the foregoing and other objects of our invention by providing, in a gain control circuit, the combination of a cathode follower, a biased diode, impedance means in shunt with the load resistance of the cathode follower, and means for controlling the impedance of this impedance means.

Throughout this specification, the ground symbol is used in a general sense, i. e., to indicate a unipotential plane which may be earth, a chassis, or a common connection in any specific realization of an embodiment of our invention.

Figure 1:
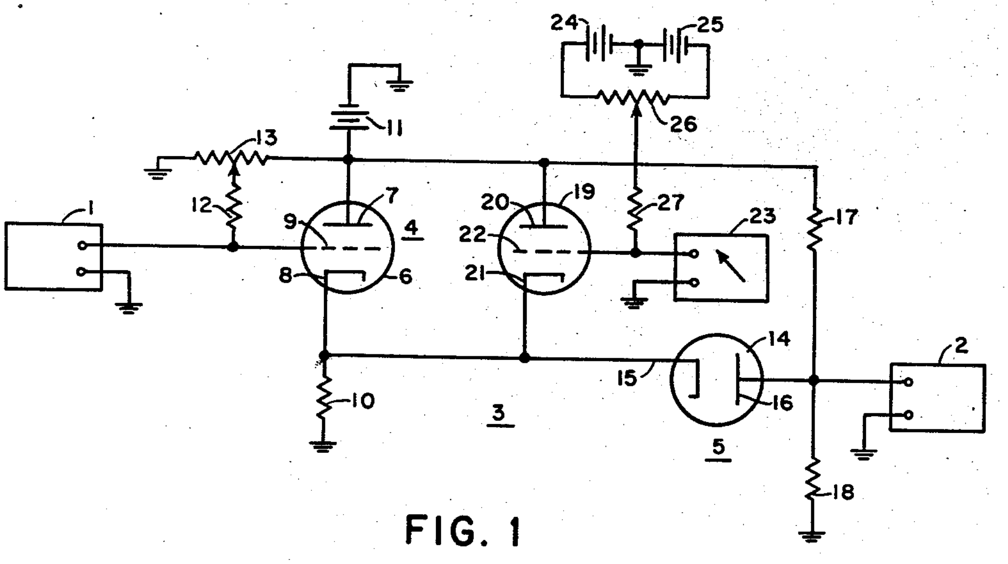
Figure 2:
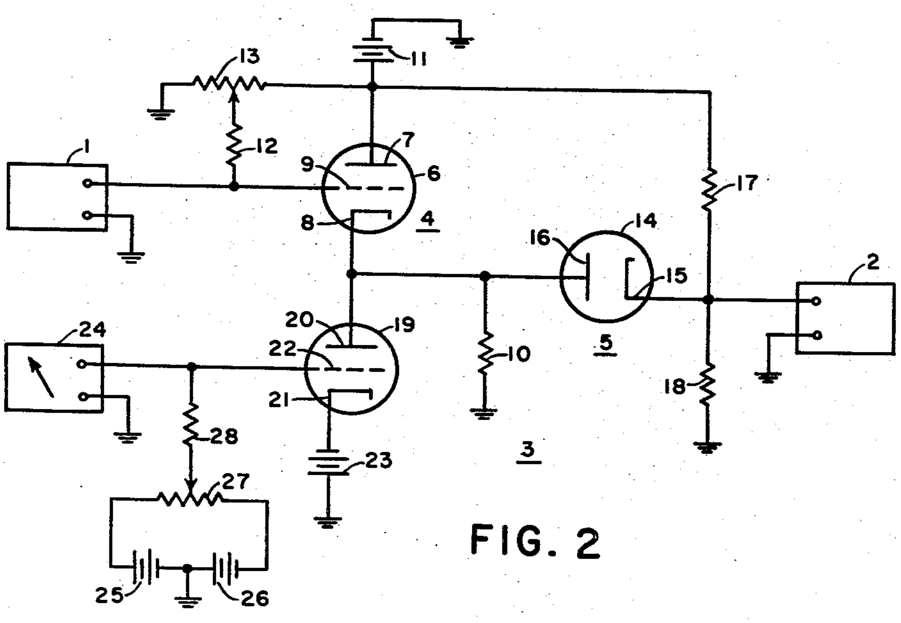

Referring now to Fig. 1, there is shown a source 1 of signals of which the gain is to be controlled, and a utilization circuit 2 which accepts the gain-controlled signals. Between source 1 and circuit 2 lies a utilization path indicated generally by 3. The latter includes cathode follower means indicated generally at 4 and unidirectional conductive means indicated generally at 5.

Cathode follower means 4 includes an electron discharge device 6 having an anode 7, a cathode 8, and a control electrode 9. Serially connected between anode 7 and cathode 8 are resistance means 10 and a suitable source of unidirectional potential, such as battery 11. In the specific example of Figures 1 and 2, the potential source 11 is connected to the anode side of the tube. Control electrode 9 is connected to source 1, and may also be provided with positive bias potential through resistor 12 from potential divider 13 which may likewise be fed from battery 11.

Resistor 10 is connected to cathode 8. Also connected to cathode 8 may be a diode 14 included in unidirectional conductive means 5. Diode 14 is provided with a cathode 15 and an anode 16, the former being connected to cathode 8 of cathode follower means 4, and the latter being connected to a voltage divider comprising resistors 17 and 18 fed in series from a convenient source of unidirectional potential, such as battery 11. The output of anode 16 is connected to the input of utilization circuit 2.

In accordance with our invention, we provide an additional electron discharge device 19 having an anode 20, a cathode 21, and a control electrode 22. Anode 20 is connected to a suitable source of unidirectional potential such as battery 11, while cathode 21 is connected to cathode 8 of cathode follower electron discharge device 6. As may be seen from the circuit drawing, Fig. 1, the additional electron discharge device 19 has its anode-cathode circuit effectively connected across resistance means 10 of cathode follower means 4. Control electrode 22 of additional electron discharge device 19 may be connected to a source 23 of gain control signals. Also connected to control element 22 is a suitable source of bias voltage provided by batteries 24 and 25 across which is connected potentiometer 26; the net bias voltage is applied to control element 22 through isolating resistor 27. With the arrangement shown, either positive or negative bias may be applied to control element 22 of additional electron discharge device 19.

We have chosen to illustrate our invention applied to the video frequency range. Source 1 may be arranged under these circumstances to furnish a negative-going video signal. With no input furnished by source 1, potentiometer 26 may be adjusted to cut off control electrode 22 of additional electron discharge device 19. Next, potentiometer 13 may be adjusted until the potential of control electrode 9 of cathode follower electron discharge device 6 is such that the potential difference across diode 14 is zero. Following this, potentiometer 26 may be adjusted until the cathode voltage of tubes 6, 14 and 19 is such that the most negative video signal from source 1 cannot cause conduction in diode 14. Under these conditions, the output appearing at anode 16 of diode 14 is zero and the gain of cathode follower means 4 is much lower.

If now the source 23 furnishes a negative-going signal, the amplitude of the video signals appearing across resistance means 10 will vary from zero to maximum in a manner depending upon the waveform applied to control element 22 of additional electron discharge device 19, the signal output being a maximum when additional electron discharge device 19 is cut off. In effect, the peak level of the signal from source 1 is varied by the voltage applied to control element 22 of additional electron discharge device 19 and the peak level changing voltage from source 23 is removed by diode 14, leaving only the original signal with only its amplitude changes.

There is shown in Fig. 2 an embodiment of our invention adapted to control positive-going video signals. In this case also, there is a signal path 3 between source of signals 1 and utilization circuit 2. Signal path 3 between source 1 and utilization circuit 2 likewise comprises cathode follower means 4 and diode means 5. Cathode follower means 4 includes cathode follower electron discharge device 6 having an anode 7, a cathode 8, and a control electrode 9. Serially connected between this anode and cathode are resistance means 10 and a suitable source of unidirectional potential, such as battery 11. There are likewise provided bias means for control electrode 9 which may comprise isolating resistor 12 and potentiometer 13 connected across battery 11.

Diode means 5 may comprise diode 14 having a cathode 15 and an anode 16. Cathode 15 may have applied thereto a positive bias furnished by voltage divider resistors 17 and 18 connected in series across a suitable source of potential, such as battery 11.

In this case, also we provide an additional electron discharge device 19 having an anode 20, a cathode 21, and a control electrode 22. Cathode 21 is biased by a suitable source of negative potential such as battery 23, the positive end of which is connected to ground. There is also provided a suitable source 24 of gain control signals. Applied to control element 22 of additional electron discharge device 19 may be a suitable source of bias potential, which may be obtained from batteries 25 and 26 across which is connected potentiometer 27, the resultant bias potential being applied through isolating resistor 28.

In the case of Fig. 2, the bias on control electrode 9 of electron discharge device 6 is adjusted so that the voltage across diode 14 is zero when grid 22 of additional electron discharge device 19 is cut off. The positive signals from source 1 thereupon appear across resistance means 10. If additional electron discharge device 19 is made to conduct heavily through reception of an appropriate positive voltage from control signal source 24, the gain of cathode follower electron discharge device 6 is reduced because of the low impedance that discharge device 19 presents across resistance means 10. The voltage across resistance means 10 is additionally lowered because of the current through discharge device 19. Diode 14 is biased under these conditions such that it cannot conduct the reduced amplitude signals appearing at anode 16.

While we have shown and described our invention as applied to a specific embodiment thereof, other modifications will readily occur to those skilled in the art. We do not, therefore, desire our invention to be limited to the specific arrangements shown and described, and we intend in the appended claims to cover all modifications within the spirit and scope of our invention.

What we claim is:

1. In a volume control system for controlling the amplification of an intelligence-modulated voltage by a volume-controlling voltage, said system comprising a cathode-follower stage with a cathode load resistor in series with a grid controlled electron discharge device, a rectifier, the rectifier being connected in series between an output circuit and the cathode end of said load resistor, means for variably biasing the anode-cathode voltage of said rectifier to non-conducting state, and a grid-controlled amplifier responsive to said volume-controlling voltage connected to vary the resistance of said cathode load resistor and to vary the gain of said cathode-follower stage.

2. In combination in a gain control circuit, a cathode follower including a grid-controlled amplifier and a cathode resistance, the grid of said amplifier being adapted to receive the signal voltage the gain of which is to be controlled, a diode serially connected between the cathode-end of said resistance and an output circuit; a fixed potential source connected to the output circuit end of said diode; and adjustable bias source connected to the grid of said amplifier for adjusting the no-signal space current through said amplifier and the voltage drop across said resistance applied to the other end of said diode to cut-off forward current through said diode; and means responsive to the gain function for variably adjusting the voltage of said other end of said diode throughout a voltage range entirely beyond the cut-off voltage of said diode so that the mentioned variable adjusting voltage cannot appear in said output circuit.

3. In combination in a gain control circuit, a follower-type amplifier including an amplifier device with a control electrode and two output electrodes and a follower-resistance, the control electrode being adapted to receive the signal voltage the gain of which is to be controlled, a diode connected between the amplifier-end of said resistance and an output circuit; a fixed potential source connected to the output circuit-end of said diode; bias means connected to said control electrode for adjusting the no-signal current through said amplifier and the voltage drop across said resistance applied to the other end of said diode to cut-off forward current through said diode; and means responsive to the desired gain function and connected to said other end of said diode for variably adjusting the voltage of said other end throughout a voltage range entirely beyond the cut-off voltage range of said diode.

4. In a gain control circuit, the combination of a signal path serially including a source of signals the amplitude of which is to be controlled, cathode follower means, and diode means; said cathode follower means including a cathode follower electron discharge device having an anode, a cathode and a control electrode, and comprising said cathode follower electron discharge device, resistance means, and a source of potential serially connected between said anode and said cathode of said cathode follower electron discharge device; said control electrode being connected to said source of signals, said resistance means being connected to said cathode of said cathode follower electron discharge device, and said diode means being connected to the junction of said cathode and said resistance means; an additional electron discharge device having an anode, a cathode, a control electrode, and an anode-cathode circuit, said anode-cathode circuit of said additional electron discharge device having substantially zero impedance connections to said resistance means; a source of control voltage connected to said control electrode of said additional electron discharge device, whereby the gain of said gain control circuit is varied in accordance with the amplitude of the control voltage received from said source of control voltage; a source of positive bias voltage, said cathode of said additional electron discharge device is connected to said cathode of said cathode follower electron discharge device, and said diode means has an anode and a cathode, said cathode of said diode means being connected to said cathode of said cathode follower electron discharge device, said anode of said diode being connected to said source of bias voltage, and the output of said signal path being taken from said anode of said diode.

5. In a gain control circuit, the combination of a signal path serially including a source of signals the amplitude of which is to be controlled, cathode follower means, and diode means; said cathode follower means including a cathode follower electron discharge device having an anode, a cathode and a control electrode, and comprising said cathode follower electron discharge device, resistance means, and a source of potential serially connected between said anode and said cathode of said cathode follower electron discharge device; said control electrode being connected to said source of signals, said resistance means being connected to said cathode of said cathode follower electron discharge device, and said diode means being connected to the junction of said cathode and said resistance means; an additional electron discharge device having an anode, a cathode, a control electrode, and an anode-cathode circuit, said anode-cathode circuit of said additional electron discharge device having substantially zero impedance connections to said resistance means; a source of control voltage connected to said control electrode of said additional electron discharge device, whereby the gain of said gain control circuit is varied in accordance with the amplitude of the control voltage received from said source of control voltage; a source of positive bias voltage, said anode of said additional electron discharge device is connected to said cathode of said cathode follower electron discharge device, and said diode means has an anode and a cathode, said anode being connected to said cathode of said cathode follower electron discharge device, said cathode of said diode being connected to said source of bias voltage, and the output of said signal path being taken from said cathode of said diode.

References Cited in the file of this patent

UNITED STATES PATENTS 2,227,056 Blumlein ---------------- Dec. 31, 1940

2,383,420 Scoles ---------------- Aug. 21, 1945
2,452,880 Van Beuren ---------------- Nov. 2, 1948
2,507,695 Dean ---------------- May 16, 1950
2,538,028 Mozley ---------------- Jan. 16, 1951
2,610,260 Moffett ---------------- Sept. 9, 1952
2,744,169 Deming ---------------- May 1, 1956

FOREIGN PATENTS 146,226 Sweden ---------------- July 20, 1954